US009227724B2

(12) United States Patent
Schmidt

(10) Patent No.: US 9,227,724 B2
(45) Date of Patent: Jan. 5, 2016

(54) AIRCRAFT LANDING GEAR

(75) Inventor: Robert Kyle Schmidt, Cheltenham (GB)

(73) Assignee: Messier-Dowty Limited (GB)

(*) Notice: Subject to any disclaimer, the term of this patent is extended or adjusted under 35 U.S.C. 154(b) by 130 days.

(21) Appl. No.: 14/239,903

(22) PCT Filed: Aug. 17, 2012

(86) PCT No.: PCT/GB2012/052016
§ 371 (c)(1),
(2), (4) Date: Apr. 24, 2014

(87) PCT Pub. No.: WO2013/027032
PCT Pub. Date: Feb. 28, 2013

(65) Prior Publication Data
US 2014/0374538 A1 Dec. 25, 2014

(30) Foreign Application Priority Data

Aug. 22, 2011 (GB) .................................... 1114419.3

(51) Int. Cl.
B64C 25/00 (2006.01)
B64C 25/34 (2006.01)
(52) U.S. Cl.
CPC ........... B64C 25/34 (2013.01); B64C 2025/008 (2013.01)
(58) Field of Classification Search
CPC ........ B64C 25/02; B64C 25/10; B64C 25/14; B64C 25/18; B64C 25/20; B64C 25/26; B64C 25/32; B64C 25/34; B64C 25/22; B64C 2025/125
USPC .... 244/103 R, 100 R, 102 R, 102 A, 102 SL, 244/102 SS
See application file for complete search history.

(56) References Cited

U.S. PATENT DOCUMENTS 6,131,852 A * 10/2000 Holloway ............... B64C 25/26
244/102 R
2009/0050736 A1* 2/2009 Bennett ................... B64C 25/22
244/102 R
2011/0233327 A1* 9/2011 Mellor .................... B64C 25/34
244/102 A

FOREIGN PATENT DOCUMENTS

GB 2470500 11/2010
GB 2474686 4/2011

OTHER PUBLICATIONS

International Search Report for International Application No. PCT/GB2012/052016 dated Jan. 2, 2013.
Combined Search and Examination Report for Application No. GB1114419.3 dated Dec. 13, 2011.
Written Opinion for PCT Application No. PCT/GB2012/052016 dated Jan. 2, 2013.

* cited by examiner

Primary Examiner — Christopher P Ellis
Assistant Examiner — Richard G Davis
(74) Attorney, Agent, or Firm — RatnerPrestia

(57) ABSTRACT

An aircraft landing gear having a strut having an upper portion for mechanically coupling to an aircraft and a lower portion movably mounted with respect to the upper portion. A bogie beam is pivotally coupled to the lower strut. A bogie control linkage is mechanically coupled to the bogie at a first connection point, and to the strut at a second connection point. The bogie control linkage has: an actuator including a locking system that inhibits actuation of the actuator; a sensor linkage mechanically coupled to the lower strut and arranged to change between first and second conditions in accordance with movement of the upper strut relative to the lower strut; and an actuator control linkage arranged to operate the locking system when the sensor linkage is in the first condition and arranged not to operate the locking system when the sensor linkage is in the second condition.

13 Claims, 3 Drawing Sheets

AIRCRAFT LANDING GEAR

This application is a U.S. National Phase application of PCT International Application No. PCT/GB2012/052016, filed Aug. 17, 2012, which claims the benefit of GB 1114419.3, filed Aug. 22, 2011.

BACKGROUND

A known type of aircraft landing gear is a controlled articulation landing gear. Generally speaking, such landing gear have a bogie beam pivotally coupled to a lower portion of a telescoping strut and a bogie control linkage arranged to control the position of the bogie beam as the strut extends and contracts. During take-off, vertical load on the landing gear is progressively reduced and, as such, the shock strut extends. The bogie control linkage controls the orientation of the bogie beam during extension of strut such that the aft axle is lower than the forward axle. In this way, as the aircraft rotates for take-off, the aircraft pivots about the aft axle, thereby providing a height and clearance advantage for the aircraft which allows a higher pitch attitude prior to the aircraft tail touching the ground and as such enables a shorter take-off.

Different types of bogie control linkage are known. A first type, known in the art as a passive controlled articulation linkage, relies on a series of links in combination with an actuator to control the position of the bogie beam. A second type, known as an active controlled articulation linkage, controls the position of the bogie beam by varying the length of a pitch trimming actuator connected directly between the bogie beam and strut.

Generally speaking, an active controlled articulation linkage is more complex than a passive controlled articulation linkage because of the requirement for a flight mode awareness control system and complex electrical and hydraulic systems for controlling the actuator.

However, passive controlled articulation linkages may suffer from a drawback in that during take-off, the bogie beam pitch angle increases to its pitch-up position and then during free-extension of the strut, the bogie beam can be forced to over-rotate and may collide with the strut, causing damage to the bogie beam and/or the strut. It is known to provide "stop blocks" at the region where impact may occur. However, stop blocks and the like can lead to corrosion of the bogie beam and/or the strut.

SUMMARY

In accordance with a first aspect of the present invention, there is provided an aircraft landing gear comprising:
 a strut having an upper portion arranged to be mechanically coupled to an aircraft and a lower portion movably mounted with respect to the upper portion;
 a bogie beam movably coupled to the lower portion of the strut;
 a bogie control linkage mechanically coupled to the bogie beam at a first connection point and to the strut at a second connection point, the bogie control linkage comprising an actuator, the actuator including a locking system operable to inhibit actuation of the actuator;
 a sensor linkage mechanically coupled to the lower portion of the strut and arranged to change between a first condition and a second condition in accordance with movement of the upper portion of the strut relative to the lower portion of the strut; and
 an actuator control linkage arranged to operate the locking system when the sensor linkage is in the first condition and arranged not to operate the locking system when the sensor linkage is in the second condition.

The sensor linkage therefore provides a mechanical indication of the extension state of the strut, which provides a degree of flight mode awareness. Thus, the condition of the sensor linkage is used to control the locking state of the actuator within the bogie control linkage, which may provide a simpler solution in comparison with known active controlled articulation systems and/or may address the identified problems with known passive controlled articulation systems.

The sensor linkage may be mechanically coupled between the upper and lower portions of the strut. This may result in a simple way of providing a mechanical indication of the extension state of the strut.

The sensor linkage may comprise two links pivotally coupled to one another, one of the links being pivotally coupled to the upper portion of the strut and the other being pivotally coupled to the lower portion of the strut. Pivotally connected links may be more resistant to fatigue than other types of linkage, such as a flexing linkage.

The sensor linkage may comprise a torque linkage. Such an embodiment advantageously utilises an existing component as the sensor linkage.

The actuator control linkage may include a lever arm which mechanically couples the sensor linkage to the locking system when the actuator control linkage is in the first configuration. Such mechanical linkages may be relatively strong, robust and low maintenance.

The lever arm may be coupled to the locking system via a lost motion mechanism.

The actuator control linkage may comprise one or more wires arranged to mechanically couple the sensor linkage to the locking system. Such a wire-based linkage may have the advantage of being arranged to conform to the shape of the landing gear, thereby protecting the wires from foreign object damage such as bird strikes.

The actuator control linkage may comprise a closed hydraulic system including a master cylinder, arranged to be driven by movement of the sensor linkage, and a slave cylinder arranged to control the locking system. The hydraulic system may be similar to that employed in a car braking system. A hydraulic linkage may be less susceptible to icing, wherein ice forms on the linkage in flight and may affect the operation of the linkage.

The locking system may comprise a mechanical lock arranged to mechanically inhibit operation or actuation of the actuator. A mechanical lock may have the advantage of more efficiently inhibiting extension and/or retraction of the actuator than, say, a hydraulic lock. Also, a mechanical lock may not affect the internal fluid pressure of the actuator when an external force attempts to extend or retract the actuator.

The locking system may comprise a valve operable to inhibit the flow of hydraulic fluid to and/or from the actuator. A hydraulic lock may be more robust that, say, a mechanical lock due to comparatively little wear between parts. Also, a hydraulic lock may be simpler to implement.

The bogie control linkage may include an articulation linkage comprising an upper articulation link pivotally coupled to the upper portion of the strut at the second connection point and a lower articulation link pivotally coupled to the bogie beam at the first connecting point, the actuator being pivotally coupled to the upper articulation link and to the upper portion of the strut.

The bogie control linkage may comprise the actuator pivotally coupled to the lower portion of the strut at the second connection point and pivotally coupled to the bogie beam at the first connecting point.

In accordance with a second aspect of the present invention, there is provided an aircraft including an aircraft landing gear according to the first aspect.

BRIEF DESCRIPTION OF THE DRAWINGS

By way of example only, certain embodiments of the invention will now be described by reference to the accompanying drawings, in which.

DETAILED DESCRIPTION

As a general overview, a landing gear according to embodiments of the invention utilises a lockable actuator as a pitch trimmer. The pitch trimmer is mechanically selected to lock, for example in its retracted position, by a linkage driven from a torque linkage. The configuration or condition of the torque linkage is directly related to the closure of the shock strut, thereby providing an indication of whether the aircraft is in the air (which is known in the art as 'flight mode' information) which is used to lock and unlock the actuator at the appropriate times.

Figure 1:
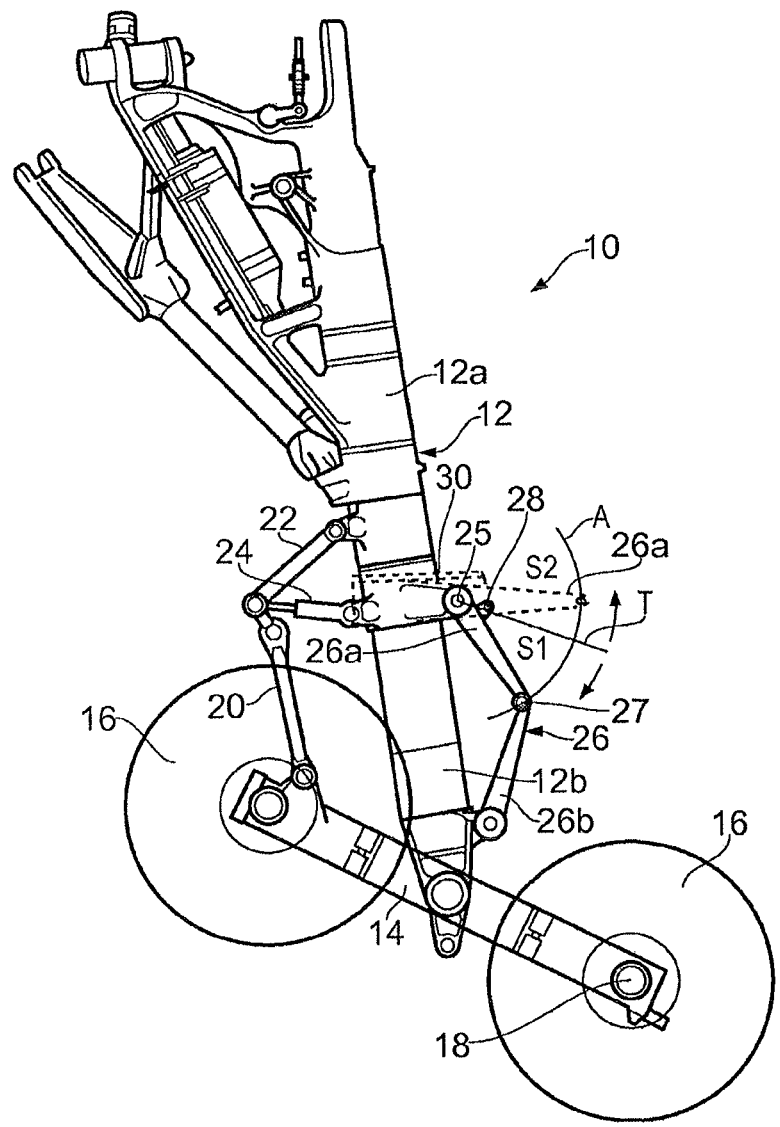
FIG. 1 is a diagram of a landing gear according to a first embodiment of the present invention.

Referring to FIG. 1, a schematic side elevation of a landing gear 10 according to a first embodiment of the invention is shown. The landing gear 10 includes a bogie control linkage of the type known in the art as a passive controlled articulation linkage. The landing gear 10 includes a strut 12 having an upper portion 12a and a lower portion 12b. The lower portion 12b is slidably mounted within the upper portion 12a. A bogie beam 14 is pivotally coupled to the lower portion 12b of the strut 12 and carries forward and aft wheel assemblies 16. The lower portion 12b axially translates within the upper portion 12a and in so doing compresses and extends a shock absorber which forms an energy absorbing element to absorb landing energy.

In the illustrated embodiment, the passive controlled articulation mechanism includes a lower articulation link 20 which is pivotally coupled to the bogie beam 14 at one end and pivotally coupled to one end of an upper articulation link 22 at the other end. The other end of the upper articulation link 22 is pivotally coupled to the upper portion 12a of the strut 12. An actuator 24 is pivotally coupled at one end to the upper articulation linkage 22 and at the other end to the upper portion 12a of the strut 12. As will be understood by the skilled person, this geometric arrangement forces the bogie beam 14 to take a 'nose up' attitude when the strut 12 is extended beyond a specific point. As the strut 12 is compressed, the bogie beam 14 pitch attitude will lower until both sets of wheels 16 contact the ground and the actuator 24 begins extending. However, during take-off, the bogie beam 14 pitch angle increases to its pitch-up position and then during free-extension of the strut 12, the bogie beam 14 can be forced to over-rotate, lifting the actuator off its stop i.e. extending the actuator and potentially contacting the lower portion 12b of the strut 12.

The landing gear 10 includes a torque linkage 26 mechanically coupled between the upper portion 12a and lower portion 12b of the strut 12. The torque linkage 26 includes an elongate upper link 26a pivotally coupled to the upper portion 12a of the strut 12 at an upper pivot 25 and an elongate lower link 26b pivotally coupled to the lower portion 12b of the strut 12. The upper and lower torque links 26a, 26b are pivotally coupled to one another at a middle pivot 27. As illustrated in FIG. 1, the angle of the upper torque link 26a is proportional to the amount of compression of the strut 12. More specifically, compression and extension of the strut 12 causes pivotal movement of the upper torque link 26a about the upper pivot 25, which causes the middle pivot to move in an arc A. A condition threshold plane or marker T bisects the arc A and divides the space between the arc A and the upper pivot 25 into a first sector S1 and a second sector S2. Thus, compression and extension of the strut 12 causes the upper torque link 26a to move between the first and second sectors S1, S2, which equate to the first and second conditions of the sensor linkage. FIG. 1 shows the torque linkage 26 with the upper link 26a in the first sector S1, corresponding to a relatively extended state of the strut 12 in which the bogie beam 14 is pivoted for takeoff and landing, which will be referred to as "two-wheel mode". The upper torque link 26a is illustrated using dashed lines when in the second sector S2, corresponding to a relatively retracted state of the strut 12 in which the bogie beam 14 is generally orthogonal with respect to the strut 12 for taxiing, which will be referred to as "four-wheel mode". Thus, the torque linkage 26 also serves as a sensor linkage arranged to change between first and second conditions based on the extension state of the strut 12.

Figure 2:
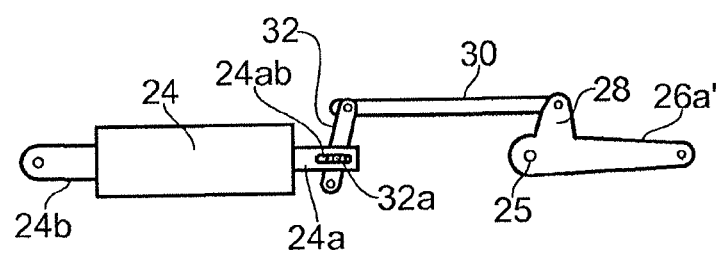
FIG. 2 is a diagram of the actuator control linkage of the landing gear of FIG. 1.

Referring additionally to FIG. 2, the landing gear 10 includes an actuator control linkage arranged to operate the locking system when the sensor linkage is in the first condition and arranged not to operate the locking system when the sensor linkage is in the second condition. In the illustrated embodiment, upper torque link 26a is provided with a lug 28 to which one end of a connecting link 30 is pivotally coupled. The other end of the connecting link 30 is pivotally coupled to a lever arm 32 which drives a lock element 24a of the actuator 24. The geometry of actuator control linkage is arranged such that when the upper torque link 26a is in the first sector S1, the lock feature of the actuator 24 is enabled and arranged such that when the upper torque link 26a is in the second sector S2, the lock feature of the actuator 24 is disabled. Once the actuator 24 is locked, the pitch angle of the bogie beam 14 will be restrained and will not be able to increase above the nominal pitch angle relative to the strut 12 except through elastic deformation of the components. As such, contact of the bogie beam 14 and lower portion 12b of the strut is inhibited.

In the illustrated embodiment, a lost motion device is provided to inhibit the mechanism from binding. A lost motion device will be understood by the skilled person and thus will not be described in detail. The lost motion device may for example comprise a slot 24ab within which a pin 32a of the lever arm 32 is housed.

Figure 3:
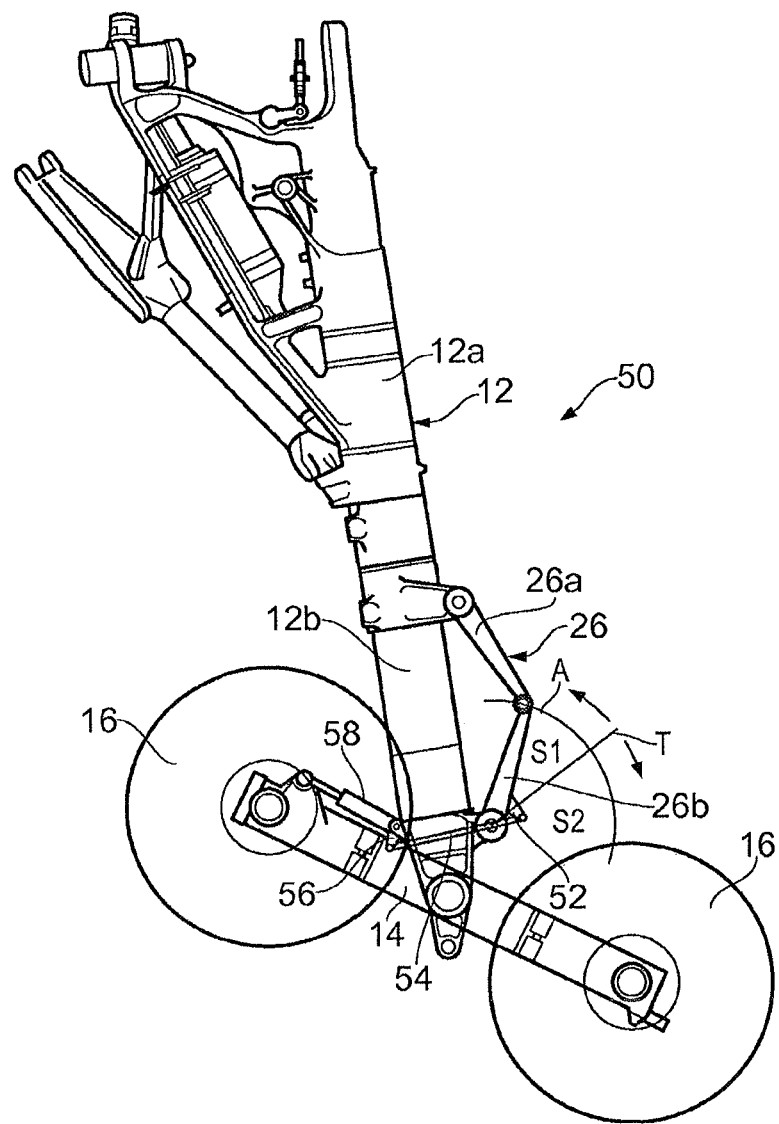
FIG. 3 is a diagram of a landing gear according to a second embodiment of the present invention.

Referring to FIG. 3, a schematic side elevation of a landing gear 50 according to a second embodiment of the invention is shown. The landing gear 50 is similar to the landing gear 10 of the first embodiment and like parts have been given the same reference numerals. However, the landing gear 50 according to this embodiment includes a bogie control linkage of the type known in the art as an active controlled articulation linkage. An actuator 58, which acts as a pitch trimmer, is directly coupled between the lower portion 12b of the strut 12 and the bogie beam 14. In this arrangement, the actuator 58 is arranged such that its end of stroke position aligns with the desired bogie beam 14 pitch angle during take off.

As with the first embodiment, the sensor linkage in this embodiment comprises the torque linkage 26. However, in this embodiment, the position of the lower torque link 26b is used to drive the actuator control linkage. Due to this, the first and second conditions of the sensor linkage are reversed relative to the first embodiment in that the first sector S1 is above the threshold marker T, with the second sector S2 being below the threshold marker T.

The actuator control linkage in this embodiment is similar to that of the first embodiment and comprises a lever 56 which is pivotally coupled to a link 54, which in turn is pivotally coupled to a lug 52 mounted to the lower torque link 26b. The lever 56 is coupled to the actuator locking element (not shown). The actuator control linkage is arranged such that that when the lower torque linkage 26b is in the first sector S1 i.e. the '2 wheel mode', the lock feature of the actuator 58 engaged. When the lower torque link 26b is in the second sector S2 i.e. the '4 wheel mode', the lock feature is disabled and the actuator 58 is free to extend.

While the actuator control linkage is shown in the illustrated embodiments as a linkage, it could in other embodiments comprise cables, including Bowden and/or Teleflex type cables. The lever arm 32, 56 could in other embodiments be replaced by a cam arrangement. In other embodiments actuator control linkage may comprise a closed hydraulic system including a master cylinder, arranged to be driven by movement of the sensor linkage, and a slave cylinder arranged to control the locking system. The hydraulic system may be similar to that employed in a car braking system. Any suitable actuator control linkage may be provided which is arranged to operate the locking system when the sensor linkage is in the first condition and arranged not to operate the locking system when the sensor linkage is in the second condition.

Any suitable a bogie control linkage mechanically may be provided which is coupled to the bogie at a first connection point and to the strut at a second connection point, the bogie control linkage comprising an actuator, the actuator including a locking system operable to inhibit actuation of the actuator.

A landing gear according to embodiments of the invention may include any type of lockable actuator in which the actuator lock is operable from the exterior of the actuator. In some embodiments, the actuator is arranged to lock only when it is at its end of stroke.

While in the illustrated embodiments the actuator locking system comprises a mechanical actuator lock, in other embodiments the locking system may comprise any suitable locking means. For example, the actuator control linkage may drive a valve which deselects the hydraulic fluid flow out of the actuator. The actuator would then be hydraulically locked in position and the only deflection under load would come from elastic deformation of the pitch trimmer and the compressibility of the oil contained within.

While in the illustrated embodiments the torque linkage advantageously also serves as the sensor linkage, in other embodiments any suitable a sensor linkage may be provided which is arranged to change between a first condition and a second condition in accordance with movement of the upper portion of the strut relative to the lower portion of the strut.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" can mean "including" or "consisting of" and therefore does not exclude the presence of elements or steps other than those listed in any claim or the specification as a whole. The singular reference of an element does not exclude the plural reference of such elements and vice-versa. In an apparatus claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear comprising:
    a strut having an upper portion arranged to be mechanically coupled to an aircraft and a lower portion movably mounted with respect to the upper portion;
    a bogie beam pivotally coupled to the lower portion of the strut;
    a bogie control linkage mechanically coupled to the bogie beam at a first connection point and to the strut at a second connection point, the bogie control linkage comprising an actuator, the actuator including a locking system operable to inhibit actuation of the actuator;
    a sensor linkage mechanically coupled to the lower portion of the strut and arranged to change between a first condition and a second condition in accordance with movement of the upper portion of the strut relative to the lower portion of the strut; and
    an actuator control linkage arranged to operate the locking system when the sensor linkage is in the first condition and arranged not to operate the locking system when the sensor linkage is in the second condition.

2. A landing gear according to claim 1, wherein the sensor linkage is mechanically coupled between the upper and lower portions of the strut.

3. A landing gear according to claim 2, wherein the sensor linkage comprises two bars pivotally coupled to one another, one of the bars being pivotally coupled to the upper portion of the strut and the other being pivotally coupled to the lower portion of the strut.

4. A landing gear according to claim 1, wherein the sensor linkage comprises a torque link.

5. A landing gear according to claim 1, wherein the actuator control linkage includes a lever arm which mechanically couples the sensor linkage to the locking system when the actuator control linkage is in the first configuration.

6. A landing gear according to claim 5, wherein the lever arm is coupled to the locking system via a lost motion mechanism.

7. A landing gear according to claim 1, wherein the actuator control linkage comprises one or more wires arranged to mechanically couple the sensor linkage to the locking system.

8. A landing gear according to claim 1, wherein the actuator control linkage comprises a closed hydraulic system arranged to couple the sensor linkage to the locking system.

9. A landing gear according to claim 1, wherein the locking system comprises a mechanical lock arranged to mechanically inhibit operation of the actuator.

10. A landing gear according to claim 1, wherein the locking system comprises a valve operable to inhibit the flow of hydraulic fluid to and/or from the actuator.

11. A landing gear according to claim 1, wherein the bogie control linkage includes an articulation linkage comprising an upper articulation link pivotally coupled to the upper portion of the strut at the second connection point and a lower articulation link pivotally coupled to the bogie beam at the first connecting point, the actuator being pivotally coupled to the upper articulation link and to the upper portion of the strut.

12. A landing gear according to claim 1, wherein the bogie control linkage comprises the actuator pivotally coupled to the lower portion of the strut at the second connection point and pivotally coupled to the bogie beam at the first connecting point.

13. An aircraft including an aircraft landing gear comprising:
- a strut having an upper portion arranged to be mechanically coupled to an aircraft and a lower portion movably mounted with respect to the upper portion;
- a bogie beam pivotally coupled to the lower portion of the strut;
- a bogie control linkage mechanically coupled to the bogie beam at a first connection point and to the strut at a second connection point, the bogie control linkage comprising an actuator, the actuator including a locking system operable to inhibit actuation of the actuator;
- a sensor linkage mechanically coupled to the lower portion of the strut and arranged to change between a first condition and a second condition in accordance with movement of the upper portion of the strut relative to the lower portion of the strut; and
- an actuator control linkage arranged to operate the locking system when the sensor linkage is in the first condition and arranged not to operate the locking system when the sensor linkage is in the second condition.

* * * * *